United States Patent
Monai

(10) Patent No.: US 8,311,033 B2
(45) Date of Patent: Nov. 13, 2012

(54) DTMF TONE SIGNAL TRANSMISSION METHOD AND DTMF TONE SIGNAL TRANSMISSION SYSTEM

(75) Inventor: Nobuhiro Monai, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 972 days.

(21) Appl. No.: 11/104,484

(22) Filed: Apr. 13, 2005

(65) Prior Publication Data
US 2005/0243872 A1  Nov. 3, 2005

(30) Foreign Application Priority Data

Apr. 16, 2004 (JP) ................................. 2004-121657

(51) Int. Cl.
*H04L 12/66* (2006.01)
*H04J 3/12* (2006.01)
(52) U.S. Cl. ......... 370/352; 370/356; 370/525; 370/526
(58) Field of Classification Search .................. 370/352, 370/356, 525, 526
See application file for complete search history.

(56) References Cited

U.S. PATENT DOCUMENTS

| 6,438,220 | B1 | 8/2002 | Liu | |
|---|---|---|---|---|
| 6,512,818 | B1 * | 1/2003 | Donovan et al. | 379/88.18 |
| 6,842,447 | B1 * | 1/2005 | Cannon | 370/352 |
| 7,039,044 | B1 * | 5/2006 | Whitfield et al. | 370/356 |
| 7,230,945 | B2 * | 6/2007 | Yeom | 370/352 |
| 7,233,605 | B1 * | 6/2007 | Oran | 370/526 |

FOREIGN PATENT DOCUMENTS

| JP | 10-285299 | 10/1998 |
|---|---|---|
| JP | 2000-59471 | 2/2000 |
| JP | 2000-188611 | 7/2000 |
| JP | 2001-333185 | 11/2001 |
| JP | 2003-502907 | 1/2003 |
| JP | 2003-219027 | 7/2003 |
| JP | 2003-224680 | 8/2003 |
| JP | 2004-64408 | 2/2004 |
| JP | 2004-506346 | 2/2004 |
| JP | 2004-509488 | 3/2004 |
| JP | 2004-120707 | 4/2004 |

OTHER PUBLICATIONS

H. Schulzrinne, S. Petrack, RFC 2833—RTP Payload for DTMF Digits, Telephony Tones and Telephony Signals, 2000, Network Working Group.*
K. Egevang, P. Francis, RFC 1631—IP Network Address Translator (NAT), May 1994, Networking Working Group.*
Japanese Patent Office issued a Japanese Office Action dated May 25, 2010, Application No. 2004-121657.

* cited by examiner

*Primary Examiner* — Rasha Al Aubaidi
*Assistant Examiner* — Nafiz E Hoque
(74) *Attorney, Agent, or Firm* — Young & Thompson

(57) ABSTRACT

It is made possible for a DTMF tone signal associated with a button depressed on an IP telephone terminal to arrive at the opposite party even if an IP telephone terminal does not have a function of sending a DTMF tone signal. If a DTMF tone signal transmission request signal detection unit in a proxy detects a DTMF tone signal transmission request signal inserted in an RTP packet or a SIP packet received from an IP telephone terminal or detects a DTMF digit signal contained in the DTMF tone signal transmission request signal, a DTMF tone signal generation unit generates a DTMF tone signal associated with the DTMF digit signal. A voice encoder encodes the DTMF tone signal in the same way as a voice signal. An RTP payload replacement unit replaces a voice signal in a payload of the RTP packet with the encoded DTMF tone signal.

8 Claims, 11 Drawing Sheets

FIG.2

*102: NAT TABLE

| GLOBAL IP ADDRESS OF ROUTER | LOCAL IP ADDRESS OF PROXY |
|---|---|
| 10.11.12.13 | 192.168.0.2 |
|  |  |

FIG.3

*104: PROXY TABLE

| GLOBAL IP ADDRESS OF IP TELEPHONE TERMINAL OF OPPOSITE PARTY | RECEIVING PORT NUMBER OF OPPOSITE PARTY | LOCAL IP ADDRESS OF IP TELEPHONE TERMINAL IN LAN | RECEIVING PORT NUMBER OF IP TELEPHONE TERMINAL IN LAN |
|---|---|---|---|
| 20.21.22.23 | 7001 | 192.168.0.11 | 6001 |
|  |  |  |  |

FIG.4

*106: CALL CONTROL TABLE

| TELEPHONE No. | LOCAL IP ADDRESS |
|---|---|
| #101 | 192.168.0.11 |
| #102 | 192.168.0.12 |
| ⋮ | |
| #110 | 192.168.0.20 |
| #201 | 192.168.0.2 |
| #202 | 192.168.0.2 |
| ⋮ | |
| #210 | 192.168.0.2 |

IP TELEPHONE TERMINAL IN LAN (#101–#110)

IP TELEPHONE TERMINAL OUTSIDE LAN (#201–#210)

LOCAL IP ADDRESS OF RTP GATEWAY

FIG.5

109: DNS TABLE

| #201 | 20.21.22.23 |
|---|---|
| #202 | 30.31.32.33 |
| ⋮ | |
| #210 | 90.91.92.93 |

DTMF TONE SIGNAL TRANSMISSION METHOD AND DTMF TONE SIGNAL TRANSMISSION SYSTEM

BACKGROUND OF THE INVENTION

The present invention relates to a DTMF (Dual-Tone Multi-Frequency) tone signal transmission method and a DTMF tone signal transmission system used to transmit a DTMF tone signal. In particular, the present invention relates to a DTMF tone signal transmission method and a DTMF tone signal transmission system used to transmit a DTMF tone signal originated from an IP (Internet Protocol) telephone terminal.

Previously, a push-phone can transmit a DTMF tone signal. Such a DTMF tone signal is used not only to transmit a telephone number but also to receive facsimile service or transmit a numeral or the like ("0," "1," "2," . . . "9," "*" or "#") in accordance with a guide of an answer-phone.

On the other hand, the IP telephone has been spread in recent years. The IP telephone uses the TCP/IP (Transmission control Protocol/Internet Protocol) as the third layer and the fourth layer of the OSI reference model, uses the SIP (Session Initiation Protocol) to conduct signaling in its upper layer, and uses the RTP (Real-time Transport Protocol) to conduct transmission of a voice codec signal. Not only the IP telephone terminal, but also fixed telephone connected to a PSTN (Public Switched Telephone Network) or a portable telephone connected to a portable telephone network becomes the opposite party of the IP telephone terminal.

As preceding technique papers relating to the present invention, Japanese Patent Application Laid-Open Publication Nos. 2000-059471, 2000-188611, 2003-219027 and 2004-064408 can be mentioned.

The IP telephone terminal is connected to a fixed telephone connected to a PSTN or a portable telephone connected to a portable telephone terminal, as well. Therefore, it is necessary for a DTMF tone signal associated with a numeral or a symbol of a button depressed by the user of the IP telephone terminal to arrive at the fixed telephone or portable telephone of the opposite party.

However, IP telephone terminals do not always have a function of sending out a DTMF tone signal.

In the case where a plurality of IP telephone terminals are connected to a local area network, it increases the cost to provide every IP telephone terminal with a function of sending out a DTMF tone signal.

SUMMARY OF THE INVENTION

Therefore, an object of the present invention is to provide a DTMF tone signal transmission method and a DTMF tone signal transmission system that makes it possible for a DTMF tone signal associated with a button depressed on an IP telephone terminal to arrive at the opposite party of talking even if the IP telephone terminal does not have a function of sending out a DTMF tone signal.

According to a first aspect, the present invention provides a DTMF tone signal transmission method including the steps of transmitting a request from an IP (Internet Protocol) telephone terminal to a proxy by using communication means to send a DTMF (Dual Tone Multi-Frequency) tone signal to a telephone terminal of opposite party, and receiving the request at the proxy by using communication means, putting the DTMF tone signal represented by a codec signal in an RTP (Real-time Transport Protocol) packet and transmitting the RTP packet from the proxy to the telephone terminal of the opposite party by using communication means.

In the DTMF tone signal transmission method, the proxy may replace a voice signal in a payload of at least one RTP packet containing a voice signal represented by a codec signal with the DTMF tone signal.

In the DTMF tone signal transmission method, the proxy may add the DTMF tone signal to a voice signal in a payload of at least one RTP packet containing a voice signal represented by a codec signal.

In the DTMF tone signal transmission method, the IP telephone terminal may transmit the request by using a SIP (Session Initiation Protocol) or the RTP.

In the DTMF tone signal transmission method, the IP telephone terminal and the proxy may be connected via a local area network, and the method may further include the steps of receiving the DTMF tone signal transmitted from the proxy via the local area network at a router by using communication means, and transmitting the DTMF tone signal received from the proxy, from the router to the telephone terminal of the opposite party via Internet by using communication means.

According to a second aspect, the present invention provides a DTMF tone signal transmission system which transmits a DTMF tone signal toward a telephone terminal of opposite party, in which the DTMF tone signal transmission system includes an IP (Internet Protocol) telephone terminal and a proxy, the IP telephone terminal includes means which transmits a request to a proxy by using communication means to send a DTMF (Dual-Tone Multi-Frequency) tone signal to the telephone terminal of opposite party, and the proxy includes means which receives the request by using communication means, putting the DTMF tone signal represented by a codec signal in an RTP (Real-time Transport Protocol) packet and transmits the RTP packet to the telephone terminal of the opposite party by using communication means.

In the DTMF tone signal transmission system, the proxy may further include means which replaces a voice signal contained in a payload of at least one RTP packet containing a voice signal represented by a codec signal with the DTMF tone signal.

In the DTMF tone signal transmission system, the proxy may add the DTMF tone signal to a voice signal contained in a payload of at least one RTP packet containing a voice signal represented by a codec signal.

In the DTMF tone signal transmission system, the IP telephone terminal may further include means which transmits the request by using a SIP (Session Initiation Protocol) or the RTP.

In the DTMF tone signal transmission system, the IP telephone terminal and the proxy may be connected via a local area network, and the DTMF tone signal transmission system may further include a router, the router including means which receives the DTMF tone signal transmitted from the proxy via the local area network by using communication means, and means which transmits the DTMF tone signal received from the proxy, to the telephone terminal of the opposite party via Internet by using communication means.

According to a third aspect, the present invention provides a proxy which transmits a DTMF tone signal toward a telephone terminal of opposite party, the proxy including means which receives a request from an IP telephone terminal by using communication means to send a DTMF (Dual-Tone Multi-Frequency) tone signal to the telephone terminal of opposite party, and means which receives the request by using communication means, putting the DTMF tone signal represented by a codec signal in an RTP (Real-time Transport Protocol) packet and transmits the RTP packet to the telephone terminal of the opposite party by using communication means.

The proxy may further include means which replaces a voice signal contained in a payload of at least one RTP packet containing a voice signal represented by a codec signal with the DTMF tone signal.

The proxy may further include means which adds the DTMF tone signal to a voice signal contained in a payload of at least one RTP packet containing a voice signal represented by a codec signal.

The proxy may further include means which receives the request from the IP telephone terminal by using a SIP (Session Initiation Protocol) or the RTP.

According to a fourth aspect, the present invention provides an IP telephone terminal including means which transmits a request to a proxy by using communication means to request the proxy to send a DTMF (Dual-Tone Multi-Frequency) tone signal to a telephone terminal of opposite party.

The IP telephone terminal may further include means which transmits the request by using a SIP (Session Initiation Protocol) or the RTP.

According to the present invention, the IP telephone terminal requests a proxy to send out a DTMF tone signal. Even if the IP telephone terminal does not have a function of sending out a DTMF tone signal, therefore, it becomes possible for a DTMF tone signal associated with a button depressed on the IP telephone terminal to arrive at the opposite party.

BRIEF DESCRIPTION OF THE DRAWINGS

FIG. 2 is a diagram showing a configuration of a NAT table shown in FIG. 1;

FIG. 3 is a diagram showing a configuration of a proxy table shown in FIG. 1;

FIG. 4 is a diagram showing a configuration of a call control server shown in FIG. 1;

FIG. 5 is a diagram showing a configuration of a DNS table shown in FIG. 1;

DESCRIPTION OF THE PREFERRED EMBODIMENTS

Hereafter, embodiments of the present invention will be described in detail with reference to the drawings.

[A. Basic system]
[1. Configuration]

Figure 1:
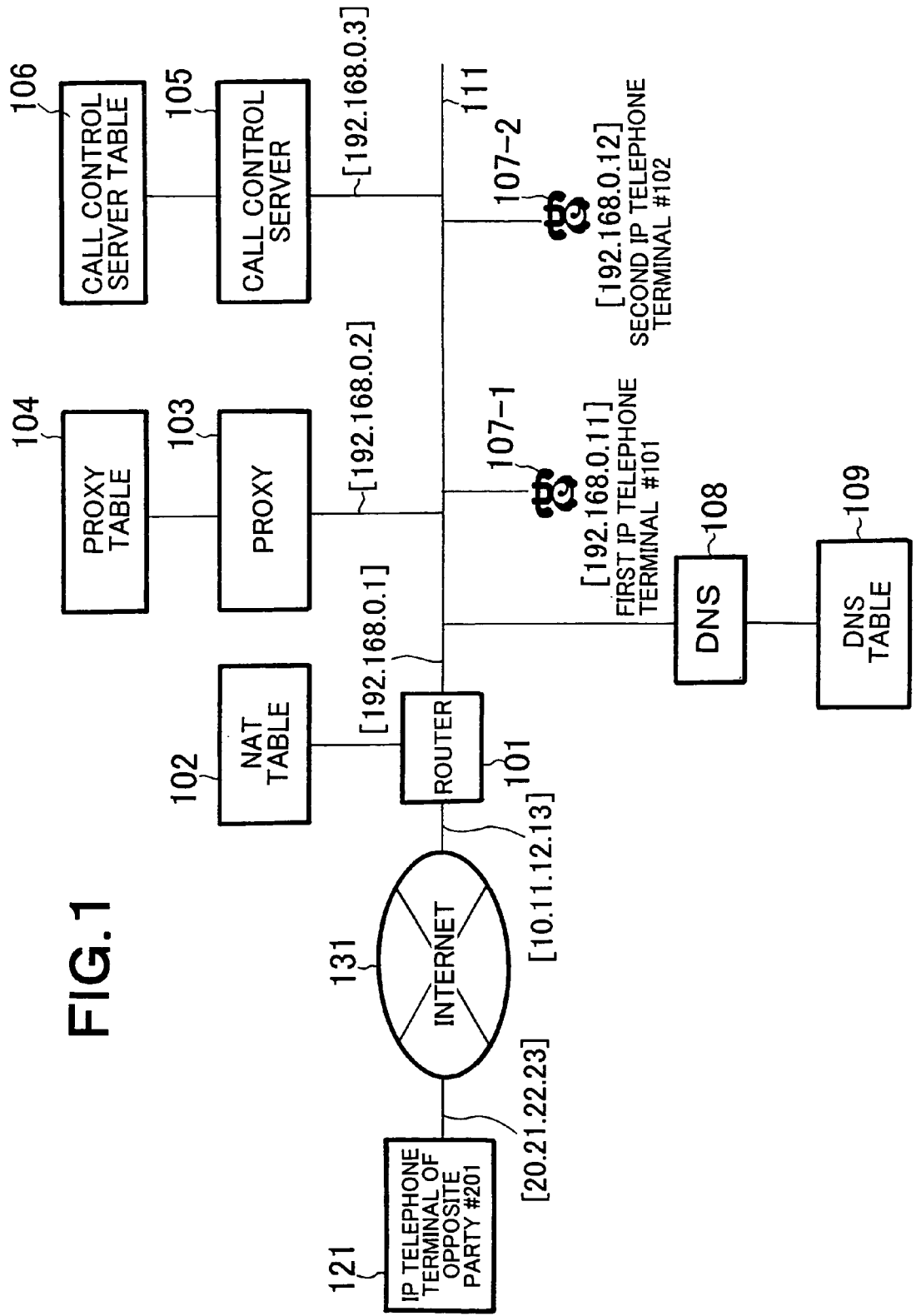
FIG. 1 is a block diagram showing a configuration of an IP telephone system according to an embodiment of the present invention.

FIG. 1 shows a configuration of an IP telephone system according to an embodiment of the present invention. In this system, transmission of a DTMF tone signal is conducted.

With reference to FIG. 1, an IP telephone system according to an embodiment of the present invention includes a router 101, a NAT (Network Address Translation) table 102, a proxy 103, a proxy table 104, a call control server 105, a call control server table 106, a first IP telephone terminal 107-1, a second IP telephone terminal 107-2, a DNS (Domain Name Server) 108, a DNS table 109, and a LAN (Local Area Network) 111. Although not illustrated, the IP telephone system may include further IP telephone terminals.

The router 101, the proxy 103, the call control server 105, the first IP telephone terminal 107-1, the second IP telephone terminal 107-2 and the DNS 108 are connected to each other via the LAN 111. The LAN 111 uses the IP (Internet Protocol) in the third layer of the OSI reference model. As shown in FIG. 1, local IP addresses in the LAN 111 are assigned, for example, as follows:

| | |
|---|---|
| Router 101 | 192.168.0.1 |
| Proxy 103 | 192.168.0.2 |
| Call control server 105 | 192.168.0.3 |
| First IP telephone terminal 107-1 | 192.168.0.11 |
| Second IP telephone terminal 107-2 | 192.168.0.12 |

The router 101 and an IP telephone terminal 121 of the opposite party are connected to each other via an Internet 131. The IP telephone terminal 121 of the opposite party is a single IP telephone terminal or an IP telephone terminal in an IP telephone system similar to the IP telephone system on the own station side. Or the IP telephone terminal 121 of the opposite party may be replaced by a gateway which connects the Internet 131 to a PSTN.

Global IP addresses in the Internet 131 are assigned, for example, as follows:

| | |
|---|---|
| Router 101 | 10.11.12.13 |
| IP telephone terminal 121 of opposite party | 20.21.22.23 |

The NAT table 102 is connected to the router 101. The proxy table 104 is connected to the proxy 103. The call control server table 106 is connected to the call control server 105. The DNS table 109 is connected to the DNS 108.

As shown in FIG. 2, the NAT table 102 retains an association relation between the global IP address of the router 101 and the local IP address of the proxy 103 since the time of system construction.

As shown in FIG. 3, the proxy table 104 has a record for each of calls already established at each occasion. Each record retains an association relation among the global IP address of the IP telephone terminal of the opposite party, receiving port number of the IP telephone terminal of the opposite party, local IP address of the IP telephone terminal in the LAN, and receiving port number of the IP telephone terminal in the LAN. Each record is generated at the time of signaling, and deleted when the call is finished.

As shown in FIG. 4, the call control server table 106 retains an association relation between a telephone number and a local IP address for each IP telephone terminal since the time of the system construction. In the example shown in FIG. 4, telephone numbers #101, #102, . . . , #110 are extension numbers of IP telephone terminals in the LAN, and telephone numbers #201, #202, . . . , #210 are telephone numbers of IP telephone terminals outside the LAN. A local IP address associated with an extension number of an IP telephone terminal in the LAN is the local IP address of the IP telephone terminal. On the other hand, a local IP address associated with a telephone number of an IP telephone terminal outside the LAN is the local IP address of the proxy.

As shown in FIG. 5, the DNS table 109 retains an association relation between a telephone number of a telephone outside the LAN and a global IP address since the time of system construction.

[2. Operation]

An IP telephone method used by the IP telephone system shown in FIG. 1 will now be described.

[2-1. Signaling]

Figure 6:
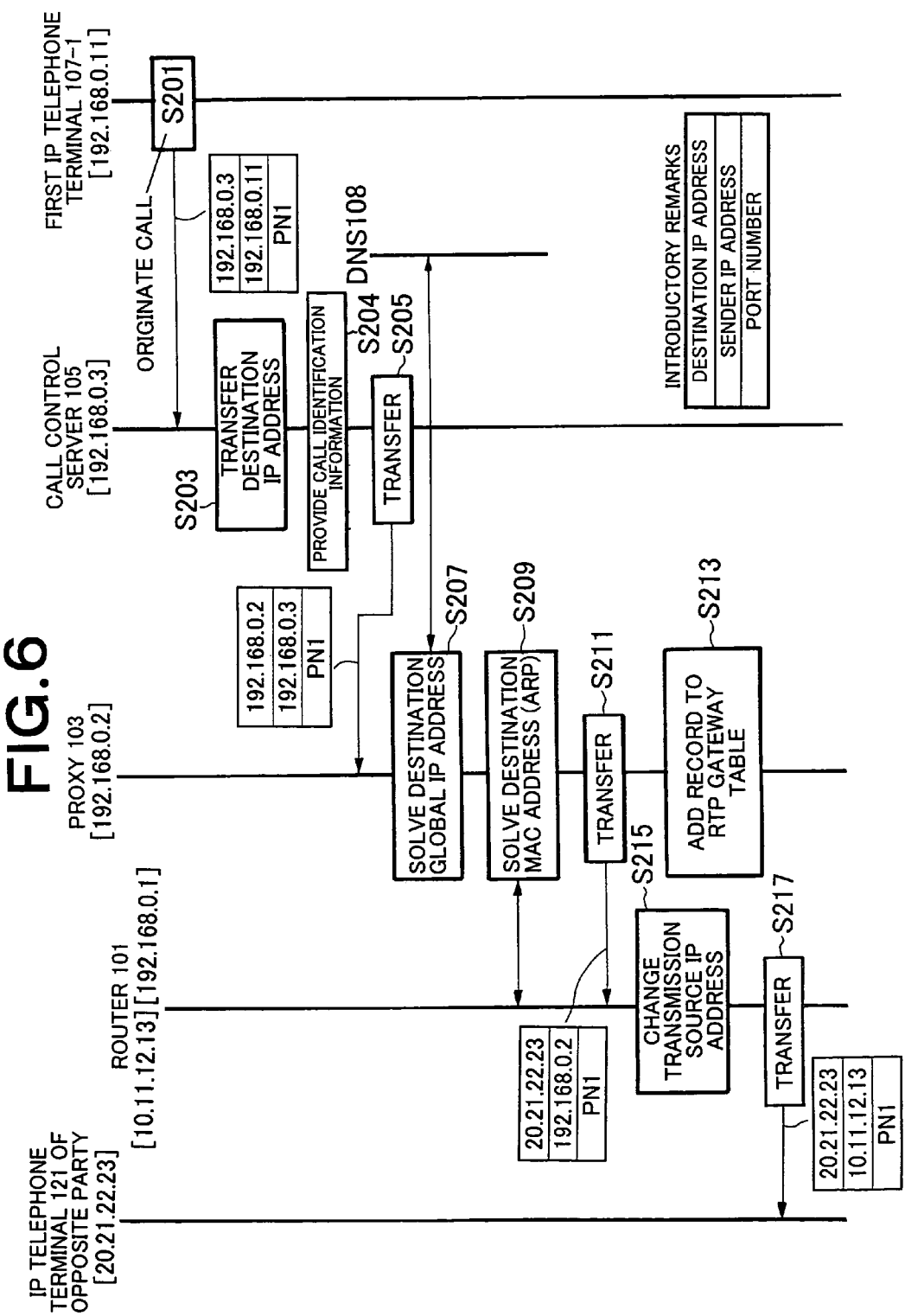
FIG. 6 is a first sequence diagram showing operation of an IP telephone system according to an embodiment of the present invention at the time of signaling.

If, for example, a first IP telephone terminal 107-1 originates a call to an IP telephone terminal 121 of the opposite party which is present outside the LAN and which has a telephone number #201 as shown in FIG. 6, the first IP telephone terminal 107-1 transmits a call origination message having caller side desiring communication conditions described in the fifth layer or higher layer of the OSI reference model (hereafter referred to simply as "upper layer") to the call control server 105. The caller side desiring communication conditions includes the telephone number #201 of the IP telephone terminal of the opposite party, information identifying a protocol that the first IP telephone terminal 107-1 desires to use, a local IP address of the first IP telephone terminal 107-1, and a receiving port number for the first IP telephone terminal 107-1 desired by the first IP telephone terminal 107-1. The information identifying a protocol that the first IP telephone terminal 107-1 desires to use is, for example, information identifying the RTP (Real-time Transport Protocol). A transmission source IP address of an IP packet that carries a call origination message is the local IP address (192.168.0.11) of the first IP telephone terminal. Its destination IP address is the local IP address (192.168.0.3) of the call control server 105. The port number is a reserved port number (PNI) for signaling (step S201).

The call control server 105 retrieves a local address (which is not the local IP address of the IP telephone terminal of the opposite party) in the own LAN associated with the telephone number #201 of the IP telephone terminal 121 contained in the call origination message received from the first IP telephone terminal 107-1, from the call control server table 106. The retrieved local IP address is the local IP address (192.168.0.2) of the proxy 103 (step S203). If, for example, an extension call is directed to the second IP telephone terminal 107-2, the local IP address (192.168.0.12) of the second IP telephone terminal 107-2 is retrieved from the call control server table 106.

Subsequently, the call control server 105 adds call identification information to the caller side desiring communication conditions (step S204). Owing to this call identification information, it becomes possible to prevent interference from/to another call.

Subsequently, the call control server 105 transfers the call origination message to the proxy 103 having the local IP address retrieved at the step S203. A transmission source IP address of an IP packet that carries the transferred call origination message is the local IP address (192.168.0.3) of the call control server 105. A destination address of the IP packet is the local IP address (192.168.0.2) of the proxy 103 (step S205). If, for example, an extension call is directed to the second IP telephone terminal 107-2, the call origination message is transferred to the second IP telephone terminal 107-2 and then ordinary signaling is conducted to start an internal call.

Subsequently, the proxy 103 inquires of the DNS 108 about the global IP address associated with the telephone number #201 of the IP telephone terminal of the opposite party described in the upper layer of the call origination message received at the step S205. The DNS 108 retrieves the global IP address associated with the telephone number #201 of the IP telephone terminal of the opposite party from the DNS table 109, and notifies the proxy 103 of the global IP address (step S207). By the way, the DNS table 109 may be connected to the proxy 103, or may be connected to the call control server 105.

Subsequently, the proxy 103 broadcasts an ARP (Address Resolution Protocol) request to know a MAC address associated with the global IP address notified at the step S207. Thereupon, the router 101 which is a default gateway returns an ARP answer packet to the proxy 103 to notify the proxy 103 of an MAC (Media Access Control) address of the router 101 (step S209).

Subsequently, the proxy 103 transfers the call origination message to the router 101. A transmission source MAC address of this call origination message is a MAC address of the proxy 103. Its destination MAC address is a MAC address of the router 101. Its transmission source IP address is the local IP address of the proxy 103. Its destination IP address is the global IP address of the IP telephone terminal of the opposite party (step S211).

Subsequently, the proxy 103 adds a new record to the proxy table 104, and writes the global IP address (20.21.22.23) of the IP telephone terminal 121 of the opposite party which is call destination and the local IP address (192.168.0.11) of the first IP telephone terminal which is call origination source into the record (step S213). The global IP address of the IP telephone terminal 121 of the opposite party is known at the step S207, and the local IP address of the IP telephone terminal is read out from the upper layer of the call origination message.

Subsequently, the router 101 changes the transmission source IP address of the call origination message received at the step S211 from the local IP address of the proxy 103 to the global IP address of the router 101 (step S215), and transfers the call origination message to the IP telephone terminal of the opposite party (step S217).

Figure 7:
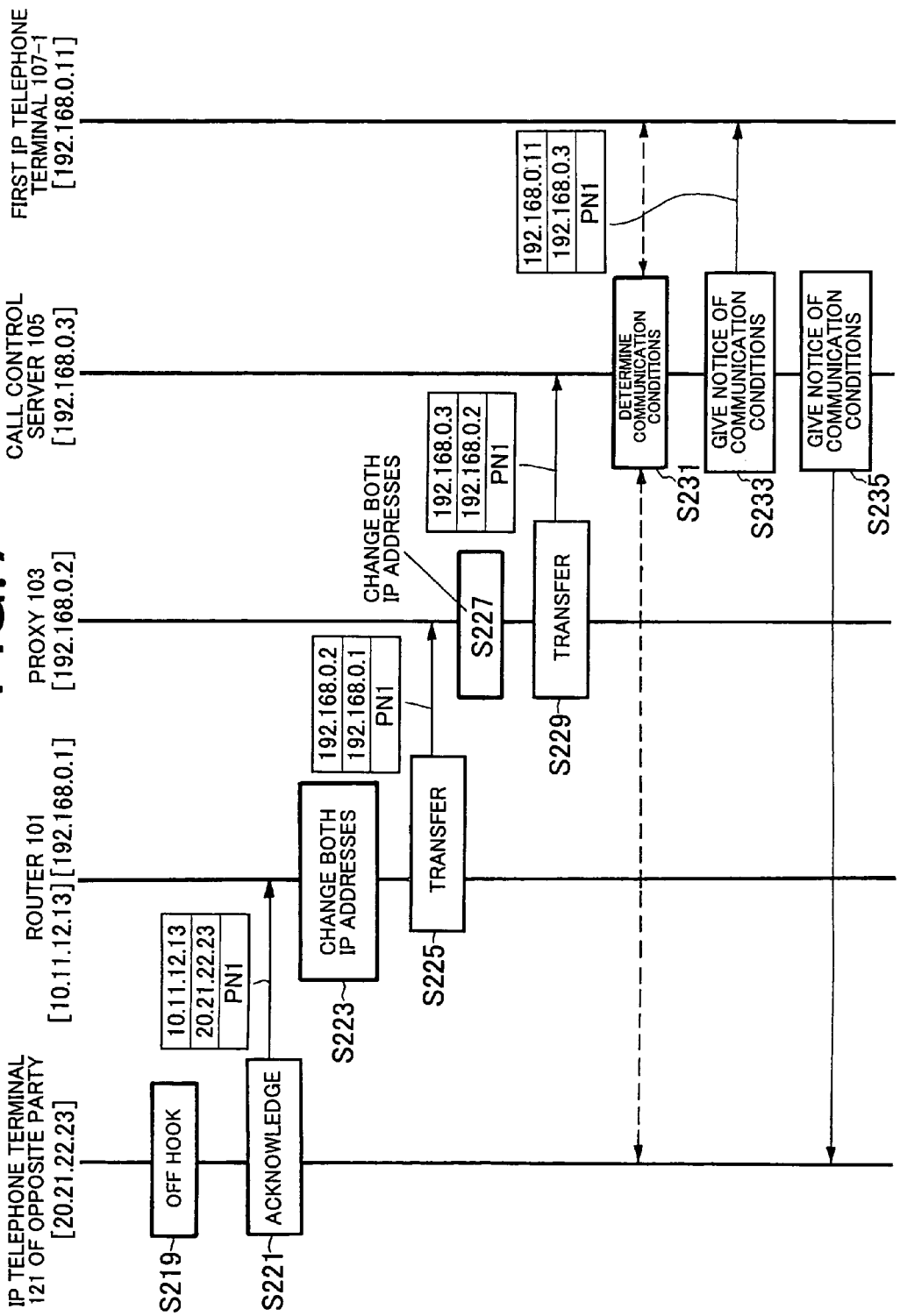
FIG. 7 is a second sequence diagram showing operation of an IP telephone system according to an embodiment of the present invention at the time of signaling.

With reference to FIG. 7, if off-hook operation is conducted on the IP telephone terminal 121 and the IP telephone terminal 121 of the opposite party decides to conduct talking under communication conditions desired by the first IP telephone terminal 107-1 or conditions modified from them (step S219), the IP telephone terminal 121 of the opposite party transmits an acknowledgement message to the router 101 (step S221). A transmission source IP address of the acknowledgement message is the global IP address (20.21.22.23) of the IP telephone terminal 121 of the opposite party. A destination IP address of the acknowledgement message is the global IP address (10.11.12.13), and the port number is a reserved port number (PNI) for signaling. The acknowledgement message includes called side desiring communication conditions. The called party desiring communication conditions include the same call identification information as the call identification information contained in the caller side desiring communication conditions, information identifying a protocol used by the IP telephone terminal 121 of the opposite party, the telephone number of the IP telephone terminal 121 of the opposite party, the global IP address of the IP telephone terminal 121 of the opposite party, and the receiving port number for the IP telephone terminal 121 of the opposite party desired by the IP telephone terminal of the opposite party.

Subsequently, the router 101 changes the transmission source IP address of the acknowledgement message received from the opposite party to the local IP address (192.168.0.1) of the router 101. By referring to the NAT table, the router 101 changes the destination IP address of the acknowledgement message to the local IP address (192.168.0.2) of the proxy 103 (step S223), and transfers the acknowledgement message to the proxy 103 (step S225).

By referring to the telephone number of the call origination source contained in the acknowledgement message received at the step S225, the proxy 103 judges that the acknowledgement message should be transferred to the call control server 105, and changes the transmission source IP address of the acknowledgement message to the local IP address (192.168.0.2) of the proxy 103, changes the destination IP address of the acknowledgement message to the local IP address (192.168.0.3) of the call control server 105 (step S227), and transfers the acknowledgement message to the call control server 105 (step S229). In the same way as the first IP telephone terminal 107-1 and the second IP telephone terminal 107-2, the proxy 103 knows the local IP address of the call control server 105 from the beginning.

By referring to the call identification information contained in the acknowledgement message received from the proxy 103, the call control server 105 recognizes that the acknowledgement message is sent in response to the call origination message from the first IP telephone terminal 107-1. On the basis of contents of both messages, the call control server 105 determines the protocol and parameters to be used for the call, the receiving port number of the first IP telephone terminal 107-1, and the receiving port number of the IP telephone terminal 121 of the opposite party (step S231). Until the determination, the call control server 105 may conduct communication with the first IP telephone terminal 107-1 and the IP telephone terminal 121 of the opposite party.

Subsequently, the call control server 105 notifies the first IP telephone terminal 107-1 of the determined protocol, parameters, the local IP address of the proxy, and the receiving port of the IP telephone terminal 121 of the opposite party (step S233).

Subsequently, the call control server 105 notifies the opposite IP telephone terminal 121 of the determined protocol, parameters, the global IP address of the router, and the receiving port of the first IP telephone terminal 107-1 (step S235).

When the signaling heretofore described is finished, the first IP telephone terminal 107-1 and the IP telephone terminal 121 of the opposite party start talking.

[2-2. Talking]

Talking is conducted via the router 101 and the proxy 103 without intervention of call control server 105.

Figure 8:
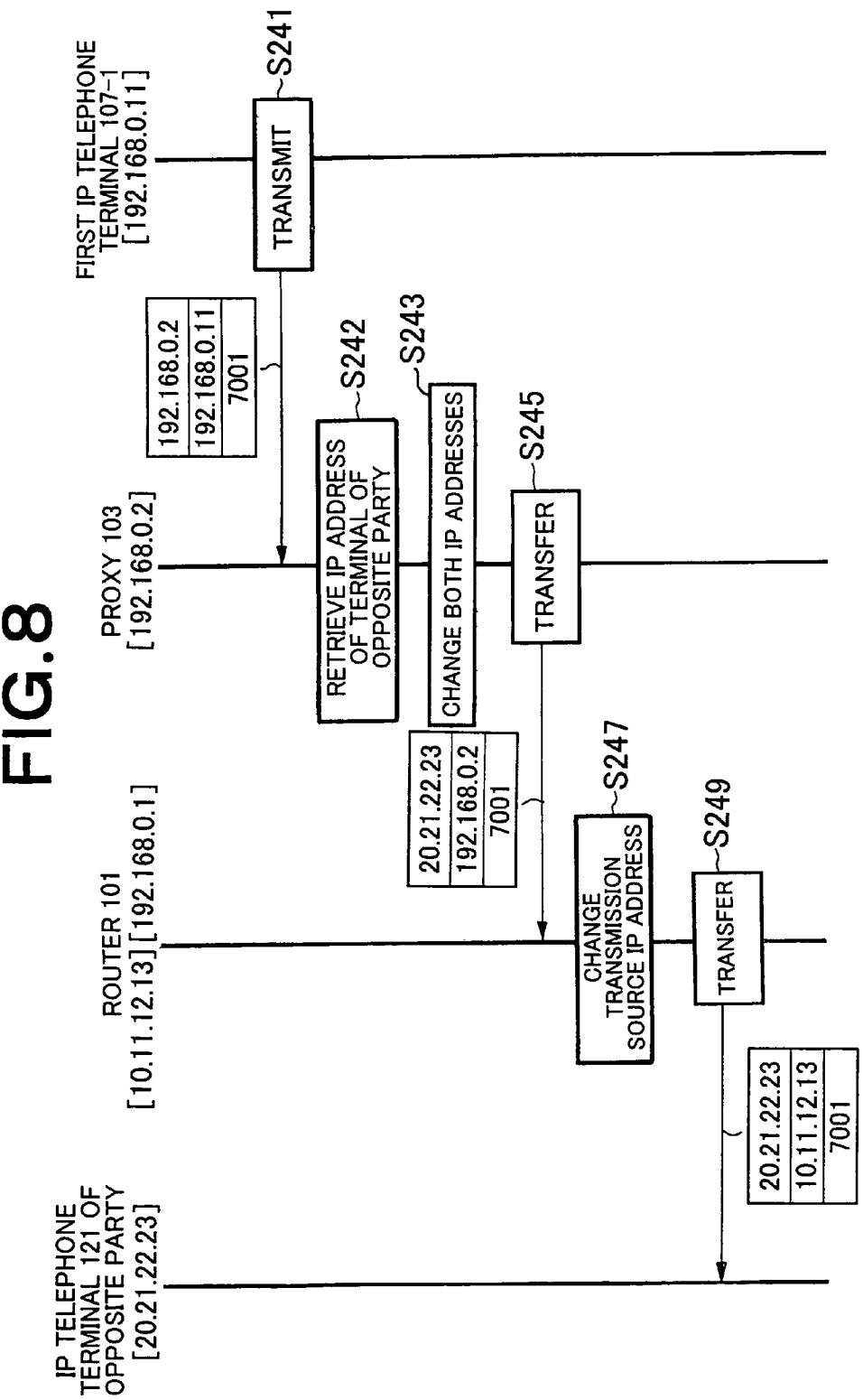
FIG. 8 is a first sequence diagram showing operation of an IP telephone system according to an embodiment of the present invention at the time of talking.

FIG. 8 is a diagram showing packets sent from the first IP telephone terminal 107-1 toward the IP telephone terminal 121 of the opposite party.

With reference to FIG. 8, the first IP telephone terminal 107-1 transmits IP packets containing voice packets such as RTP packets to the proxy 103 (step S241). The transmission source IP address of the IP packets is the IP address (192.168.0.11) of the first IP telephone terminal 107-1. The destination IP address of the IP packets is the IP address (192.168.0.2) of the proxy 103. The port number of the IP packets is a receiving port number (7001) of the IP telephone terminal 121 of the opposite party.

Subsequently, the proxy 103 retrieves the IP address (20.21.22.23) of the IP telephone terminal 121 of the opposite party associated with the port number (7001) of the IP packets received at the step S241, from the proxy table 104. The proxy 103 may conduct reconfirmation by determining whether the IP address (20.21.22.23) is included in one or more IP addresses retrieved from the proxy table 104 as an IP address associated with the transmission source IP address (192.168.0.11) (local IP address of the first IP telephone terminal 107-1) of the IP packets received at the step S241 (step S242).

Subsequently, the proxy 103 changes the transmission source IP address of the received IP packets to the local IP address (192.168.0.2) of the proxy 103, changes the destination IP address of the IP packets to the IP address (20.21.22.23) of the IP telephone terminal 121 of the opposite party retrieved at the step S242 (step S243), and transfers the changed IP packets to the router 101 (step S245).

Subsequently, the router 101 retrieves the global IP address (10.11.12.13) of the router 101 associated with the transmission source IP address (192.168.0.2) of the received IP packets, from the NAT table 102, changes the transmission source IP address of the received IP packets to the retrieved global IP address (10.11.12.13) of the router 101 (step S247), and transmits the changed IP packets to the IP telephone terminal 121 of the opposite party (step S249).

Figure 9:
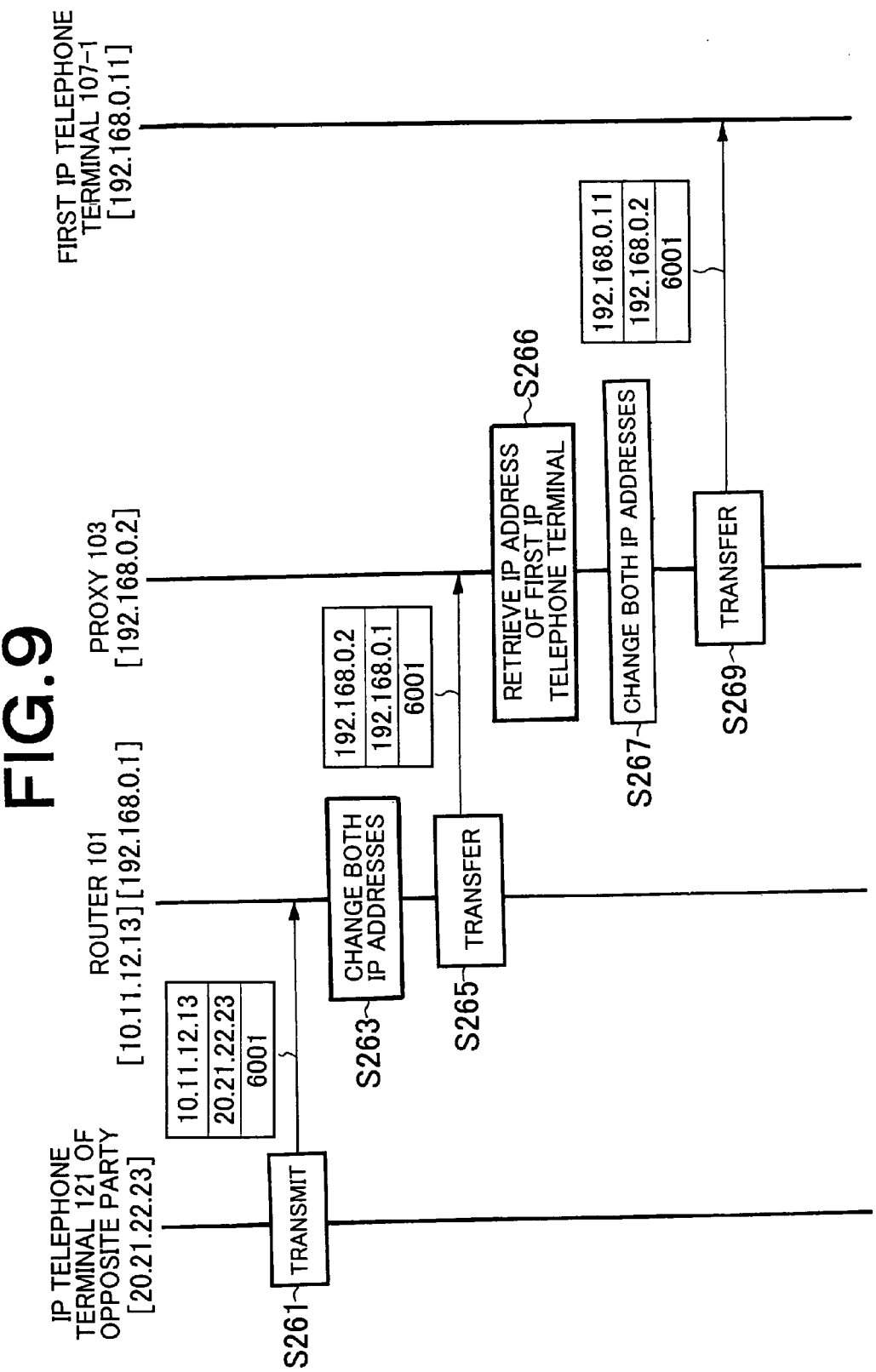
FIG. 9 is a second sequence diagram showing operation of an IP telephone system according to an embodiment of the present invention at the time of talking.

FIG. 9 is a diagram showing packets sent from the IP telephone terminal 121 of the opposite party toward the first IP telephone terminal 107-1.

With reference to FIG. 9, the IP telephone terminal 121 of the opposite party transmits IP packets containing voice packets such as RTP packets to the router 101 (step S261). The transmission source IP address of the IP packets is the global IP address (20.21.22.23) of the IP telephone terminal 121 of the opposite party. The destination IP address of the IP packets is global IP address (10.11.12.13) of the router 101. The port number of the IP packets is a receiving port number (6001) of the first IP telephone terminal 107-1.

Subsequently, the router 101 retrieves the local IP address (192.168.0.2) of the proxy 103 associated with the global IP address (10.11.12.13) of the router 101 described as the destination address of the IP packets received at the step S261, from the NAT table 102, and changes the destination IP address of the IP packets received at the step S261 to the retrieved local IP address (192.168.0.2) of the proxy 103 (step S263). The transmission source IP address of the IP packets remains the global IP address (20.21.22.23) of the IP telephone terminal 121 of the opposite party.

Subsequently, the router 101 transmits the IP packets changed in transmission source IP address and destination IP address at the step S263, to the proxy 103 (step S265).

Subsequently, the proxy 103 retrieves the local IP address (192.168.0.11) of the first IP telephone terminal associated with the port number (6001) (global IP address of the IP telephone terminal of the opposite party) of the IP packets received at the step S265, from the proxy table 104 (step S266).

Subsequently, the proxy 103 changes the transmission source IP address of the IP packets received at the step S265 to the local IP address (192.168.0.11) of the proxy 103, changes the destination IP address of the IP packets to the local IP address (192.168.0.11) of the of the first IP telephone terminal 107-1 (step S267), and transmits the changed IP packets to the first IP telephone terminal 107-1 (step S269).

[B. Transmission of DTMF tone signal]

An IP telephone terminal 107 includes numeral buttons and symbol buttons in the same way as the ordinary telephone set. If a user of the IP telephone terminal 107 depresses any button, a DTMF tone signal associated with the button arrives at an apparatus of the opposite party such as the IP telephone terminal 121 of the opposite party. In the Internet, this DTMF tone signal is transmitted in a voice codec signal. On the other hand, in the PSTN or a portable telephone network, the DTMF tone signal is transmitted in an analog signal form or, if occasion demands, in digital data form.

Figure 10:
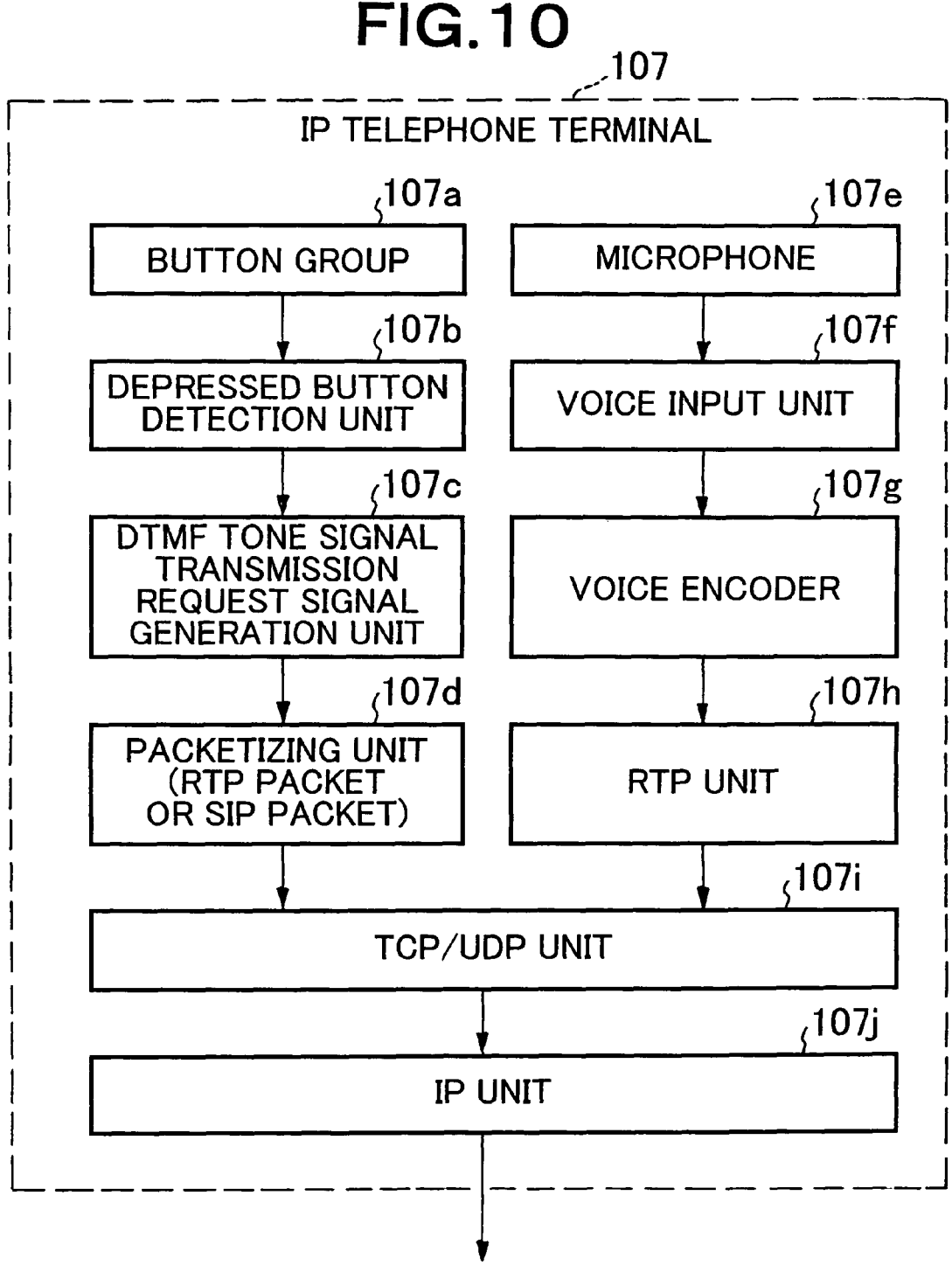
FIG. 10 is a block diagram showing a portion relating to DTMF tone signal transmission in an IP telephone terminal according to an embodiment of the present invention.

FIG. 10 is a block diagram showing a portion relating to DTMF tone signal transmission in the IP telephone terminal 107.

With reference to FIG. 10, the IP telephone terminal 107 includes a button group 107a, a depressed button detection unit 107b, a DTMF tone signal transmission request signal generation unit 107c, a packetizing unit 107d, a microphone 107e, a voice input unit 107f, a voice encoder 107g, an RTP unit 107h, a TCP/UDP (Transmission Control Protocol/User Data Protocol) unit 107i and an IP unit 107j.

The button group 107a includes numeral buttons and symbol buttons. The depressed button detection unit 107b detects a depressed button in the button group 107a by using the matrix scan or the like. The DTMF tone signal transmission request signal generation unit 107c generates a DTMF tone signal transmission request signal accompanied with a DTMF digit signal which is digital data representing frequency components which shall be contained in a DTMF tone signal associated with the depressed button detected by the depressed button detection unit 107b. The packetizing unit 107d packetizes the DTMF tone signal transmission request signal to generate an RTP packet or a packet according to the SIP. If the DTMF tone signal transmission request signal is packetized to generate an RTP packet, the payload type is arbitrary. Ordinarily, however, a payload type of at least 96 is used. If the DTMF tone signal transmission request signal is packetized to generate a packet according to the SIP, for example, an INFO method may be used, or it may be included in an OPTIONS request.

The microphone 107e is supplied with voice, and outputs a voice signal. The voice input unit 107f amplifies the voice signal, and conducts analog-digital conversion on the voice signal. The voice encoder 107g encodes voice digital data in accordance with a predetermined encoding scheme (for example, PCMU, PCMA, G.722, G.723, G.728 and G.729). The RTP unit 107h generates an RTP packet containing the encoded voice digital data as a payload.

The TCP/UDP unit 107i adds a TCP header or a UDP header to payload data in accordance with the payload type, and generates a TCP packet or a UDP packet. The IP unit 107j adds an IP header to the TCP packet or UDP packet, and generates an IP packet.

Figure 11:
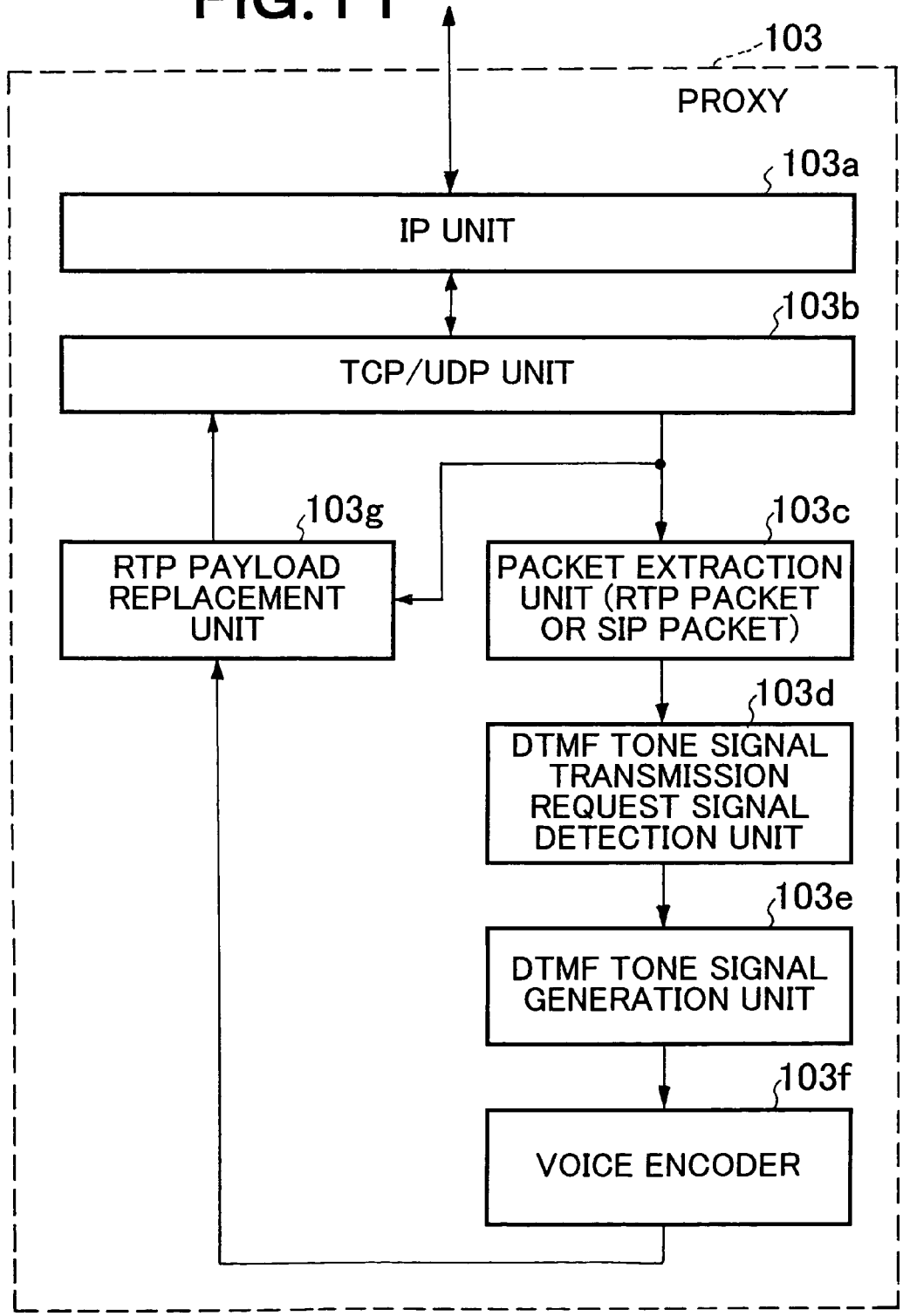
FIG. 11 is a block diagram showing a portion relating to DTMF tone signal transmission in a proxy according to an embodiment of the present invention.

FIG. 11 is a block diagram showing a portion of the proxy 103 relating to DTMF tone signal transmission according to a first form.

With reference to FIG. 11, the proxy 103 includes an IP unit 103a, a TCP/UDP unit 103b, a packet extraction unit 103c, a DTMF tone signal transmission request signal detection unit 103d, a DTMF tone signal generation unit 103e, a voice encoder 103f, and an RTP payload replacement unit 103g.

The IP unit 103a extracts a TCP packet or a UDP packet which is an IP payload from an IP packet received from the IP telephone set 107. Furthermore, the IP unit 103a adds an IP header to the TCP packet or the UDP packet received from the TCP/UDP unit 103b, thereby generates an IP packet, and transmits the IP packet to the router 101. The TCP/UDP unit 103b extracts a payload from the TCP packet or the UDP packet which is an IP payload received from the IP unit 103a. Furthermore, the TCP/UDP unit 103b adds a UDP header to an RTP packet received from the RTP payload replacement unit 103g, and thereby generates a UDP packet.

The packet extraction unit 103c extracts a payload of the TCP packet or UDP packet received from the TCP/UDP unit 103b that includes a DTMF tone signal transmission request signal. The DTMF tone signal transmission request signal detection unit 103d detects a DTMF tone signal transmission request signal and a DTMF digit signal contained therein from the payload of the TCP packet or UDP packet extracted by the packet extraction unit 103c. The DTMF tone signal generation unit 103e generates a DTMF tone signal having frequency components represented by the DTMF digit signal which is detected by the DTMF tone signal transmission request signal detection unit 103d. The voice encoder 103f encodes the DTMF tone signal generated by the DTMF tone signal generation unit 103e, in accordance with a predetermined encoding scheme. Depending upon the encoding scheme, it might become impossible to decode the DTMF tone signal with a high quality. In accordance with the encoding scheme such as G.711 free from such a defect, therefore, the voice encoder 103f encodes the DTMF tone signal.

By the way, it is also possible to integrate the DTMF tone signal generation unit 103e and the voice encoder 103f, previously prepare encoded DTMF tone signals associated with respective DTMF digit signals, and store their association relations in a storage unit. And a DTMF tone signal associated with a DTMF digit signal detected by the DTMF tone signal transmission request signal detection unit 103d may be read from the storage unit.

The RTP payload replacement unit 103g replaces a voice signal in a payload of at least one RTP packet containing a voice signal received from the TCP/UDP unit 103b with an encoded DTMF tone signal while the voice encoder 103f is encoding the DTMF tone signal. Therefore, it is necessary to unify the encoding schemes for the voice signal and the DTMF tone signal so as to make it possible for the voice decoder to decode the voice signal and the DTMF tone signal over before and after the replacement.

The RTP packet (containing a voice signal or a DTMF tone signal) output from the RTP payload replacement unit 103g is packetized to generate a UDP packet by the TCP/UDP unit 103b, and packetized to generate an IP packet by the IP unit 103a. The resultant packet arrives at the IP telephone terminal 121 of the opposite party via the router 101 and the Internet 131.

Figure 12:
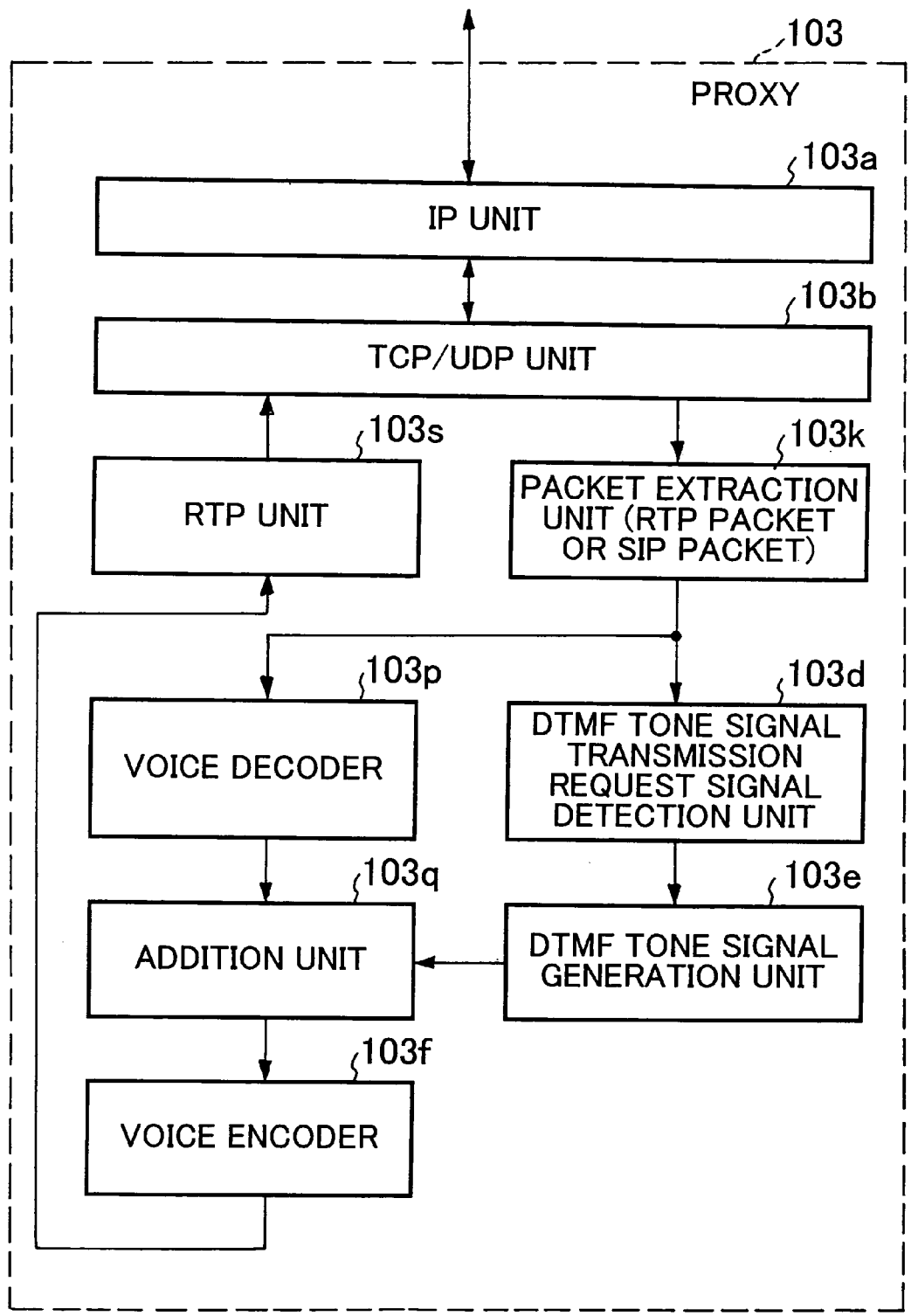
FIG. 12 is a block diagram showing a portion relating to DTMF tone signal transmission in a proxy according to another embodiment of the present invention.

FIG. 12 is a block diagram showing a portion of the proxy 103 relating to DTMF tone signal transmission according to a second form.

With reference to FIG. 12, the proxy 103 includes an IP unit 103a, a TCP/UDP unit 103b, a packet extraction unit 103k, a DTMF tone signal transmission request signal detection unit 103d, a DTMF tone signal generation unit 103e, a voice encoder 103p, an addition unit 103q, a voice encoder 103f and an RTP unit 103s.

The IP unit 103a extracts a TCP packet or a UDP packet which is an IP payload from an IP packet received from the IP telephone set 107. Furthermore, the IP unit 103a adds an IP header to the TCP packet or the UDP packet received from the TCP/UDP unit 103b, thereby generates an IP packet, and transmits the IP packet to the router 101. The TCP/UDP unit 103b extracts a payload from the TCP packet or the UDP packet which is an IP payload received from the IP unit 103a. Furthermore, the TCP/UDP unit 103b adds a UDP header to an RTP packet received from the RTP unit 103s, and thereby generates a UDP packet.

The packet extraction unit 103k extracts a payload that includes a DTMF tone signal transmission request signal and a payload that includes a voice codec signal from payloads of the TCP packet or UDP packet received from the TCP/UDP unit 103b. The DTMF tone signal transmission request signal detection unit 103d detects a DTMF tone signal transmission request signal and a DTMF digit signal contained therein from the payload of the TCP packet or UDP packet extracted by the packet extraction unit 103c. The DTMF tone signal generation unit 103e generates a DTMF tone signal having frequency components represented by the DTMF digit signal which is detected by the DTMF tone signal transmission request signal detection unit 103d.

The voice decoder 103p extracts a voice codec signal from an RTP packet which is a payload of a UDP packet containing the voice codec signal received from the packet extraction unit 103k, and decodes the voice codec signal to obtain a voice signal. While the DTMF tone signal generation unit 103e is generating a DTMF tone signal, the adder 103q adds the DTMF tone signal to the voice signal received from the voice decoder 103p. While the DTMF tone signal generation unit 103e is not generating a DTMF tone signal, the adder 103q outputs the voice signal received from the voice decoder 103p as it is.

The voice encoder 103f encodes a voice signal received from the adder 103q or a signal obtained by adding a DTMF tone signal to the voice signal, in accordance with a predetermined encoding scheme. Depending upon the encoding scheme, it might become impossible to decode the DTMF tone signal with a high quality. In accordance with the encoding scheme such as G.711 free from such a defect, therefore, the voice encoder 103f encodes the DTMF tone signal.

The RTP unit 103s adds an RTP header to the voice codec signal, or a codec signal of a voice and DTMF tone signal received from the voice encoder 103f, and thereby generates an RTP packet.

An RTP packet (that contains a voice signal) or an RTP packet (that contains a voice signal and a DTMF tone signal) output from the RTP unit 103s is packetized to generate a UDP packet by the TCP/UDP unit 103b, and packetized to generate an IP packet by the IP unit 103a. The resultant packet arrives at the IP telephone terminal 121 of the opposite party via the router 101 and the Internet 131.

What is claimed is:

1. A DTMF (Dual-Tone Multi-Frequency) tone signal transmission method executed in a system comprising first and second IP (Internet Protocol) telephone terminals, and a proxy connected to the first and second IP telephone terminals utilizing IP communication, the method comprising:
   transmitting a request to generate a digitized and packetized DTMF tone signal from the first IP telephone terminal to the proxy by using the IP communication in order to send the digitized and packetized DTMF tone signal to the second IP telephone terminal;
   receiving the request to generate the digitized and packetized DTMF tone signal at the proxy;
   generating at the proxy an original DTMF tone signal based on the request to generate the digitized and packetized DTMF tone signal;
   converting the original DTMF tone signal with a voice codec at the proxy making the original DTMF tone signal to become an DTMF tone signal represented by a codec signal;
   putting the DTMF tone signal represented by a codec signal in an RTP (Real-time Transport Protocol) packet at the proxy; and
   transmitting the RTP packet from the proxy to the second IP telephone terminal by using the IP communication,
   wherein the proxy decodes a voice signal from the first IP telephone terminal, adds the original DTMF tone signal to the decoded voice signal, and converts the original DTMF tone signal added with the decoded voice signal with the voice codec at the proxy making the original DTMF tone signal added with the decoded voice signal to become represented by a codec signal.

2. The DTMF tone signal transmission method according to claim 1, wherein the first IP telephone terminal transmits the request by using a SIP (Session Initiation Protocol) or the RTP.

3. The DTMF tone signal transmission method according to claim 1, wherein
   the first IP telephone terminal and the proxy are connected via a local area IP network, the DTMF tone signal transmission method further comprises:
   receiving the DTMF tone signal transmitted from the proxy via the local area IP network at a router by using the IP communication; and
   transmitting the DTMF tone signal represented by a codec signal received from the proxy, from the router to the second IP telephone terminal via the Internet by using the IP communication.

4. A DTMF (Dual-Tone Multi-Frequency) tone signal transmission system which transmits a digitized and packetized DTMF tone signal from a first IP telephone terminal (Internet Protocol) to a second IP telephone terminal of opposite party, a proxy connected to said first IP telephone terminal and said second IP telephone terminal utilizing IP communication,
   wherein the first IP telephone terminal comprises a unit which transmits a request to generate the digitized and packetized DTMF tone signal to the proxy by using the IP communication in order to send the digitized and packetized DTMF tone signal to the second IP telephone terminal,
   wherein the proxy comprises a unit which receives the request to generate the digitized and packetized DTMF tone signal, generates an original DTMF tone signal in response to the request, converts the original DTMF tone signal with a voice codec at the proxy making the original DTMF tone signal to become an DTMF tone signal represented by a codec signal, puts the DTMF tone signal represented by a codec signal in an RTP (Real-time Transport Protocol) packet at the proxy, and transmits the RTP packet to the second IP telephone terminal by using the IP communication, and
   wherein the proxy decodes a voice signal from the first IP telephone terminal, adds the original DTMF tone signal to the decoded voice signal, and converts the original DTMF tone signal added with the decoded voice signal with the voice codec at the proxy making the original DTMF tone signal added with the decoded voice signal to become represented by a codec signal.

5. The DTMF tone signal transmission system according to claim 4, wherein the first IP telephone terminal further comprises a unit which transmits the request by using a SIP (Session Initiation Protocol) or the RTP.

6. The DTMF tone signal transmission system according to claim 4, wherein,
   the first IP telephone terminal and the proxy are connected via a local area IP network,
   the DTMF tone signal transmission system further comprises a router, and
   wherein the router comprises:
   a unit which receives the DTMF tone signal represented by a codec signal transmitted from the proxy via the local area IP network by using the IP communication; and means which transmits the DTMF tone signal represented by a codec signal received from the proxy, to the second IP telephone terminal via the Internet by using the IP communication.

7. A proxy which transmits a digitized and packetized DTMF (Dual-Tone Multi-Frequency) tone signal toward an IP (Internet Protocol) telephone terminal of opposite party, the proxy comprising:
    a unit which receives a request from an IP telephone terminal of an originating party by utilizing IP communication in order to generate the digitized and packetized DTMF tone signal and send the digitized and packetized DTMF tone signal to the IP telephone terminal of opposite party; and
    a unit which receives the request to generate the digitized and packetized DTMF tone signal by using the IP communication, generates an original DTMF tone signal in response to the request, converts the original DTMF tone signal with a voice codec at the proxy making the original DTMF tone signal to become an DTMF tone signal represented by a codec signal, puts the DTMF tone signal represented by a codec signal in an RTP (Real-time Transport Protocol) packet at the proxy and transmits the RTP packet to the IP telephone terminal of the opposite party by using the IP communication,
    wherein the IP telephone terminal is connected to a network using the IP communication,
    wherein the IP telephone terminal of opposite party is also connected to the network,
    wherein the proxy exists in the midst of the network, and
    wherein the proxy further comprises a unit which decodes a voice signal from the first IP telephone terminal, adds the original DTMF tone signal to the decoded voice signal, and converts the original DTMF tone signal added with the decoded voice signal with the voice codec at the proxy making the original DTMF tone signal added with the decoded voice signal to become represented by a codec signal.

8. The proxy according to claim 7, wherein the proxy further comprises a unit which receives the request from the originating IP telephone terminal by using a SIP (Session Initiation Protocol) or the RTP.

* * * * *